(12) United States Patent
Stevens

(10) Patent No.: US 6,308,823 B1
(45) Date of Patent: Oct. 30, 2001

(54) PADDED CHAIN FOR A CONVEYOR

(75) Inventor: David Stevens, Hudsonville, MI (US)

(73) Assignee: Stevens Design & Fabrication, Inc., Jenison, MI (US)

(*) Notice: Subject to any disclaimer, the term of this patent is extended or adjusted under 35 U.S.C. 154(b) by 0 days.

(21) Appl. No.: 09/617,665

(22) Filed: Jul. 17, 2000

Related U.S. Application Data

(63) Continuation of application No. PCT/US00/02178, filed on Jan. 28, 2000.

(51) Int. Cl.$^7$ .................................................. B65G 13/07
(52) U.S. Cl. ........................ 198/790; 198/853; 198/850; 198/845
(58) Field of Search ..................... 198/790, 781.03, 198/845, 850, 851, 853

(56) References Cited

U.S. PATENT DOCUMENTS

| | | |
|---|---|---|
| 2,792,928 | 5/1957 | Holz . |
| 2,951,578 | * 9/1960 | Hibbard ................... 198/845 |
| 3,189,161 | 6/1965 | Schneider et al. . |
| 3,306,430 | 2/1967 | Fogg . |
| 3,352,407 | * 11/1967 | Wright ...................... 198/853 |
| 4,050,323 | 9/1977 | I'Anson . |
| 4,074,805 | 2/1978 | Bodewes . |
| 4,233,907 | 11/1980 | Brown et al. . |
| 4,441,607 | 4/1984 | Bowman et al. . |
| 4,458,809 | 7/1984 | White et al. . |
| 4,490,970 | * 1/1985 | Curl ........................ 198/851 |
| 4,524,863 | 6/1985 | Moge . |
| 4,562,921 | 1/1986 | Leemkuil et al. . |
| 4,588,073 | 5/1986 | Abell . |
| 4,619,205 | 10/1986 | Sticht . |
| 4,643,297 | 2/1987 | Krieger et al. . |
| 4,658,951 | 4/1987 | Saunders . |
| 4,712,484 | 12/1987 | Sticht . |
| 4,753,339 | 6/1988 | Vogt et al. . |
| 4,893,709 | * 1/1990 | Schroeder et al. ........... 198/853 |
| 5,065,860 | 11/1991 | Faulkner . |
| 5,107,982 | 4/1992 | Walter . |
| 5,176,246 | 1/1993 | Wiggers et al. . |
| 5,234,302 | * 8/1993 | Gawve et al. ............... 198/845 |
| 5,375,696 | 12/1994 | Collins et al. . |
| 5,540,323 | 7/1996 | Schiesser et al. . |
| 5,582,287 | 12/1996 | Heit et al. . |
| 5,810,158 | 9/1998 | Schiesser et al. . |
| 5,826,702 | 10/1998 | Gibson et al. . |
| 5,906,267 | 5/1999 | Heit et al. . |

* cited by examiner

Primary Examiner—Donald P. Walsh
Assistant Examiner—Mark A. Deuble
(74) Attorney, Agent, or Firm—Rader, Fishman, Grauer & McGarry

(57) ABSTRACT

A conveyor chain formed of parallel links with pins extending laterally therefrom has pads mounted to the pins. Each pad has an elongated planar upper surface extending further than the distance between adjacent pins on the links. A notch on each end of the pad enables adjacent pads to overlap each other, and the shape of a notch and location of apertures in the pad enables the upper surfaces to define a substantially continuous contact surface when adjacent chain links are not wrapped, and enable the chain to engage a drive sprocket regardless of the direction of wrap.

21 Claims, 6 Drawing Sheets

PADDED CHAIN FOR A CONVEYOR

RELATED APPLICATION

This application is a continuation of PCT International Application Number PCT/US00/02178, filed Jan. 28, 2000.

BACKGROUND OF THE INVENTION

1. Field of the Invention

This invention relates to conveyors and drive mechanisms for conveyors, and more particularly to a padded chain for conveying articles or driving rollers in a conveying system such as an accumulation conveyor.

2. Related Art

Over the yeas, various combinations of chain and rubber or plastic pads or belts have been devised and used to drive the rollers in a roller conveyor. These devices include a chain drive wherein a pad or high friction member is a continuous band, similar to a belt, mounted to the chain links wherein the links are positioned horizontally with respect to the conveyor rollers as in U.S. Pat. No. 5,176,246 to Wiggers et al. They also include devices where an elastic belt is mounted to a chain wherein the chain rollers are parallel to the rollers of a conveyor as in U.S. Pat. No. 4,074,085 to Bodewes. It is also known to use individual pads, one of which is mounted on each link of the chain as disclosed, for example, in U.S. Pat. No. 4,458,809 to White et al., and U.S. Pat. No. 5,906,267 to Heit et al.

One of the limitations of devices such as the horizontal continuous belt of the Wiggers et al. patent or roller mounted pads as in the Bodewes and White et al. patents is that the chain is incapable of a reverse wrap. Consequently, the drive chain can only effectively move the rollers in a single direction.

A known solution to the "reverse wrap" problem is found in padded chains wherein individual pads are mounted exterior of and parallel to the links. An example of this construction is shown in FIGS. 1 and 2, illustrating a padded conveyor drive chain 60 manufactured by Rapid Industries. The drive chain 60 comprises a plurality of interconnected conventional links 62. An elastomeric pad 64 is mounted on each side of the chain 60 on consecutive links 62 by pins 66 extending laterally through the links 62, securing the pads 64 by an external link-shaped washer 68. Each pad 64 is roughly trapezoidal shaped, thereby enabling the chain 60 to wrap in both directions.

One of the limitations of the padded chain of FIGS. 1 and 2 is that spaces exist between the respective pads 64, generating significant noise and uneven motion as the chain 60 interacts with the rollers 50 as part of the chain conveyor 10, 12, 14. They also may not provide adequate "gripping" if the chain were to be used as a conveyor itself, moving articles requiring special handling such as furniture or appliances.

These and other limitations of known padded chain conveyors remain significant problems in the industry.

SUMMARY OF THE INVENTION

A padded chain according to the invention is particularly suited to function as a propelling member for articles or for another conveyor, and finds application especially practical for accumulation conveyors. The propelling member typically comprises a roller chain of the type having pins extending laterally therefrom. A plurality of high friction pads is secured to the laterally extending pins. Each pad has an elongated upper surface, longer than the distance between two adjacent pins, and a cutout portion at each end of the pad. Each cutout portion defines an inside face that overlaps the inside face of an adjacent pad so that the roller chain can be reverse-wrapped around a sprocket, and the upper surface will maintain a substantially continuous contact surface regardless of the direction of wrap.

Other objects, features, and advantages of the invention will be apparent from the ensuing description in conjunction with the accompanying drawings.

DETAILED DESCRIPTION OF THE PREFERRED EMBODIMENT

Figure 1:
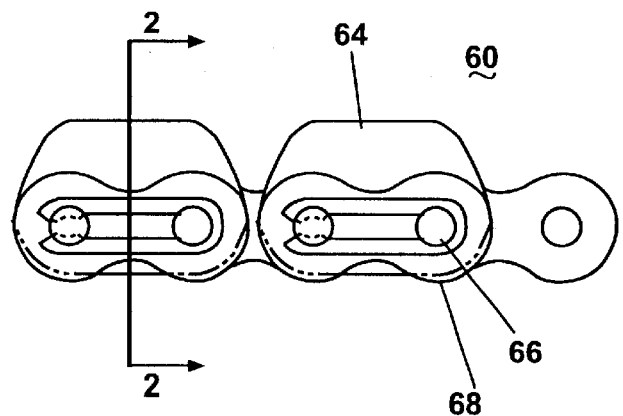
FIG. 1 depicts a prior art padded chain.

Looking now to FIGS. 3–7, a padded drive chain 90 according to the invention is shown, comprising a steel chain 100 to which are affixed a plurality of chain pads 200. The steel chain 100 is conventional in that it comprises of a number of pairs of inner links 110, each link pair being joined by a pair of sleeves 116 and each pair of inner links 110 being connected to an adjacent pair of inner links 110 by a pair of outer links 120 with hollow rollers 126 extending through the sleeves 116 to conjoin the pairs of outer links 120. Thus, each pair of inner links 110 is free to rotate in two directions relative to the joined pair of outer links 120.

Chain pads 200 according to the invention as described below are adapted to be mounted to the outer links 120. An elongated pin 132, sized to rotatably mount within each hollow roller 126, extends through each roller 126 on both sides of the chain 100. On one side of the chain, two pins 132 are connected to each other in a parallel relationship by a fixed pin connector or fixed side link 134. The fixed pin connector 134 is, but need not be, shaped congruently with the outer link 120 with which it is parallel. The connector 134 is secured to the pins 132 by any well known fastening relationship, e.g., riveting the ends of the pins. A chain pad 200 is mounted to the pins between the fixed pin connector 134 and the outer link 120 on one side of the chain 100. The end of each pin 132 opposite the fixed pin connector 134 comprises an annular groove 133. A removable pin connector or removable bide link 136, typically shaped congruently relative to a fixed pin connector 134 or an outer link 120, is received over the pins 132 and retained thereon by a spring clip or snap washer 138 adapted to clip onto the pins 132 in cooperation with the annular grooves 133. Another chain pad 200 is mounted to the pins 32 between the removable pin Connector 136 and the outer link 120 on the other side of the chain 100.

Figure 8:
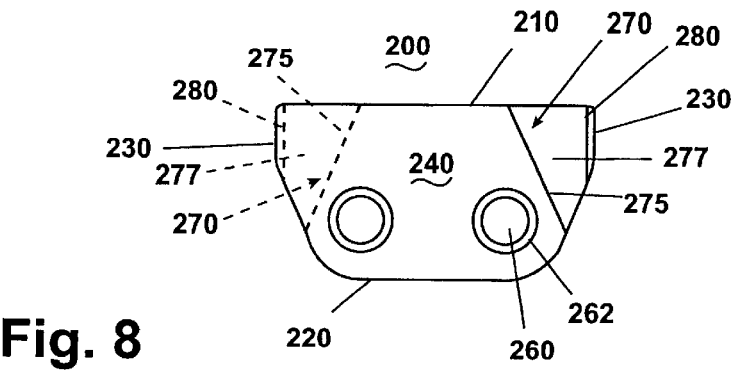
FIG. 8 is an enlarged side view of a chain pad of the padded conveyor chain of FIGS. 3–7.
Figure 9:
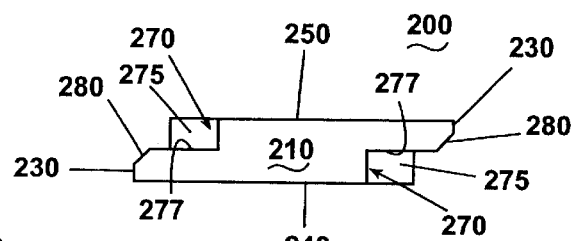
FIG. 9 is an enlarged plan view of a chain pad of the padded conveyor chain of FIGS. 3–8.
Figure 10:
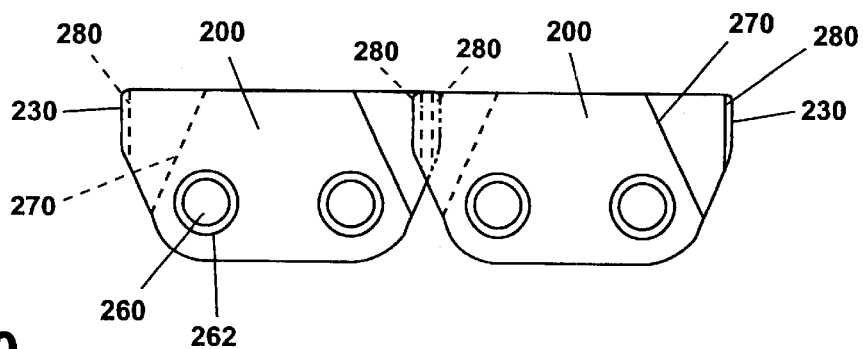
FIG. 10 is an enlarged side view of two interacting chain pads of the padded conveyor chain of FIGS. 3–11.

Referring now in particular to FIGS. 8–10, the chain pad 200 is generally trapezoidal in side view, having a generally flat top surface 210, a generally flat bottom surface 220, and two truncated ends 230. Referring specifically to FIG. 9, which is a plan view of the chain pad 200, the chain pad has an inside face 240 and an. outside face 250 substantially parallel to each other. The inside and outside faces 240, 250 are substantially identical mirror images of each other. The chain pad 200 has a pair of apertures 260 passing therethrough, each of the apertures 260 opening to the inside face 240 and further comprising an annular recess 262 around it. The recess 262 accommodates any lip on the rollers 124 to which the outer links 120 are connected so that the inside surface 240 of the chain pad 200 can filly abut the adjacent outer link 120 when it is mounted on the pin 132. Each of the inside and outside faces 240, 250 have at one end thereof a cutout 270 forming a sloped shoulder 275 and a side face 277. Each side face 277 is substantially parallel with the opposite respective inside or outside face 240, 250. It will be apparent in FIG. 10 that adjacent chain pads 200 overlap where side faces 277 on adjacent pads actually face each S other. In other words, the cutouts 270 provide a space whereby corresponding ends 230 of adjacent chain pads 200 can nest in close relationship with each other, yet the top surface 210 remains essentially contiguous along the length of the chain. Each of the projecting ends 230 of the chain pad 200 preferably has a chamfered edge 280 between the end 230 and the side face 277 in order to minimize any tendency for adjacent ands to abut as the chain 100 wraps around a sprocket as explained more fully below.

Figure 11:
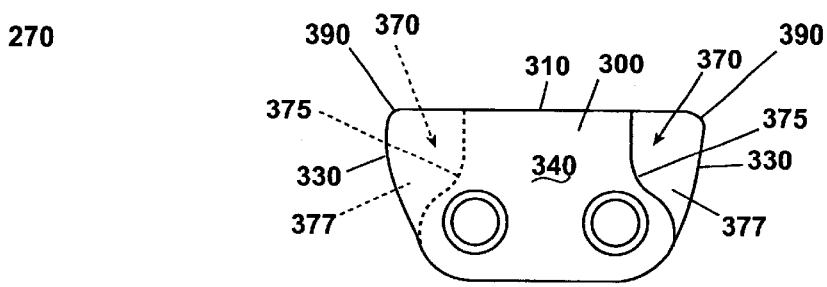
FIG. 11 is an enlarged side view of an alternative embodiment of a chain pad of the padded conveyor chain allowing even tighter reverse wrapping according to the invention.

An alternative embodiment of the chain pad according to the invention is disclosed in FIG. 11, wherein a chain pad 300 has a generally concave cutout 370 rather than the straight cutout 270 of the first embodiment. The resulting shoulder 375 is arcuate, and preferably, the end wall 330 is also curved rather than being truncated in order to better nest within an adjacent cutout 370. A curved top edge 390 is also provided at each end of the pad 300. The principal benefit of this embodiments is that a tighter reverse wrap can be obtained as explained below, while still maintaining a substantially contiguous top surface 310.

ASSEMBLY

The steel chain 100 will generally come as a pre-assembled unit. To this assembled steel chain 100 will be attached the chain pads 200.

The assembly comprising a pair of pins 132 and the fixed pin connector (fixed side link) 134 receive a chain pad 200 with the outside face 250 of the chain pad abutting the side link 134 and the pins extending from the inside face 240. The pins 132 are then inserted into two adjacent hollow rollers 126 connecting the outer links 120 until the inside face 240 of the chain pad 200 abuts the outer link 120. Any lip of the hollow roller 126 extending beyond the outer link 120 nests within the annular recess 262 surrounding the aperture 260 on the inside face 240 of the chain pad 200. A second chain pad 200 is then placed over the protruding pins 132 until any raged lip of the opposing hollow roller 126 nests in the annular recess 262 surrounding the respective apertures 260 on the inside face 240 of the second chain pad 200 and the inside face 240 fully abuts the second outer link 120. The removable pin connector (removable side link) 136 is then placed over the pins 132 to abut the second chain pad 200 and is retained in place by a spring clip 138 which cooperates with the annular grooves 133 proximate the ends of the pins 132.

The process is repeated as a pair of chain pads 200 is attached to each of the outer links 120 of the steel chain 100. The top surfaces 210 of this plurality of chain pads 200 forms a continuous surface for conveying articles or for driving the rollers of a conveyor.

OPERATION

Figure 12:
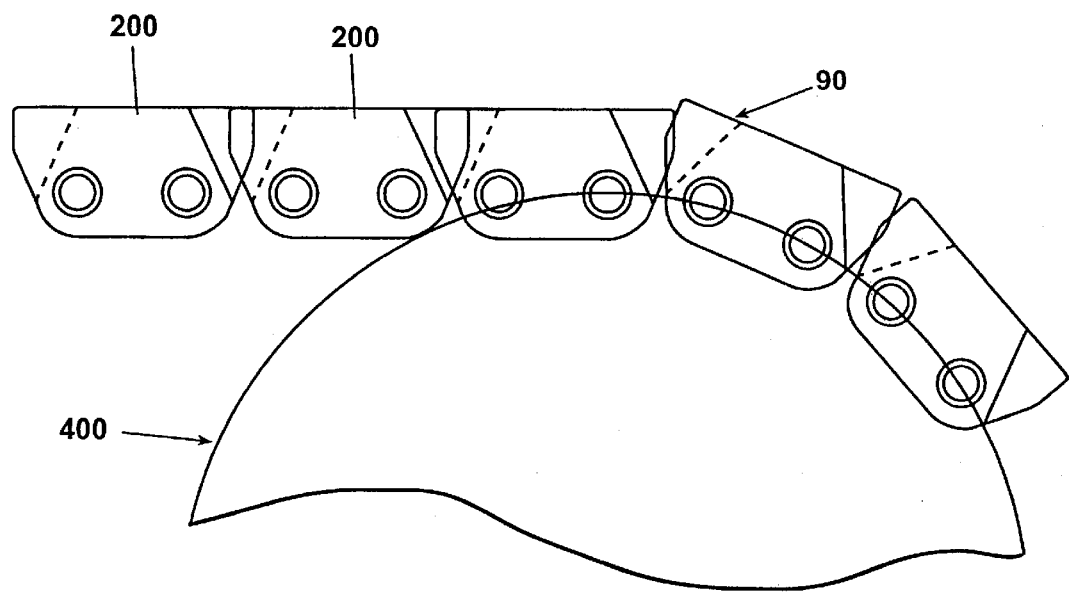
FIG. 12 is a partial side view of a padded chain according to the invention wrapping around a sprocket.

FIG. 12 schematically depicts the conformance of the padded chain 90 about a sprocket 400. In the normal configuration of the chain according to the invention, the pads enable a substantially contiguous top surface 210 as the chain 100 approaches the sprocket 400. Where a normal outside wrap of the sprocket 400 is accomplished, the chain pads 200 will naturally rotate with the chain 100, allowing the chain to normally wrap around the sprocket 400. When the chain 90 is normally wrapped on the outside of the sprocket 400, as in FIG. 12, the end 230 of each chain pad 200 tends to move away from the facing shoulder 275 of the adjacent cutout 270, and in fact, the facing side faces 277 may actually separate. As the chain 100 leaves the sprocket, the chain pads 200 tend to rotate back toward each other and the chambers 280 on the ends 230 cooperate to smoothly re-overlap the side faces 277, preventing each end 230 from hanging up on the end 230 on the adjacent chain pad 200.

Figure 13:
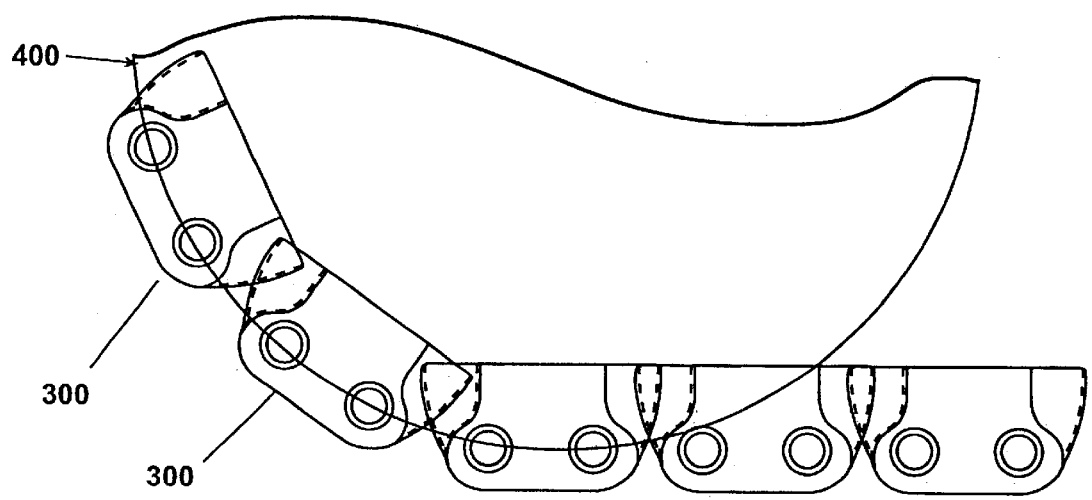
FIG. 13 is a partial side view of a padded chain according to the invention reverse wrapping around a sprocket.

FIG. 13 shows the padded chain 90 with the second embodiment of the. chain pads, 300 reverse-wrapped around the sprocket 400. On the reverse wrap, wherein prior art chain pads might normally press against each other and prevent the chain from conforming to the sprocket 400, the cut outs, 370 allow the chain pads 300 to nest within each other. The padded chain 90 can thus be carried in a reverse wrap arrangement on the sprocket 400. The curved cutouts 370 and curved top edge 390 will generally allow the chain 90 with chain pads 300 to conform to a smaller sprocket radius 400. The chain pads according to the invention thus enable reverse wrapping the chain on a sprocket, while further having the advantage of presenting a smooth, substantially continuous surface on which to convey articles or to drive the rollers of the conveyor.

Figure 2:
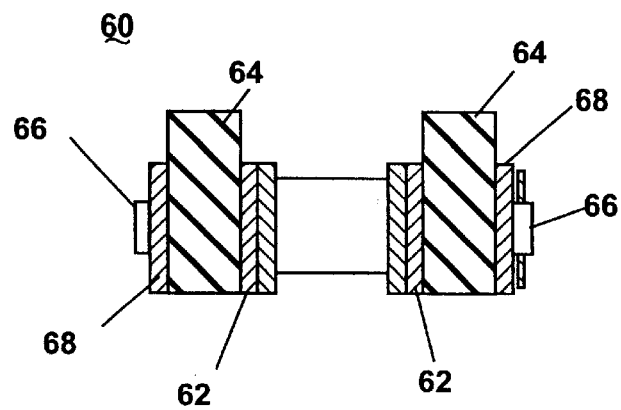
FIG. 2 is a cross-sectional view through line 2—2 of the padded chain of FIG. 1.
Figure 3:
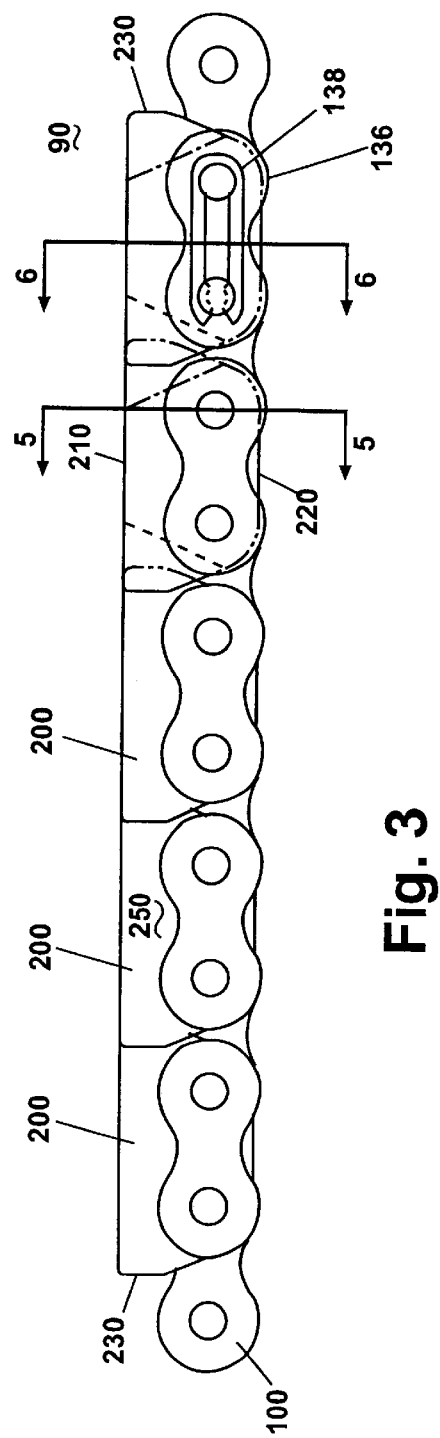
FIG. 3 is a side view of a padded conveyor chain according to the invention.
Figure 4:
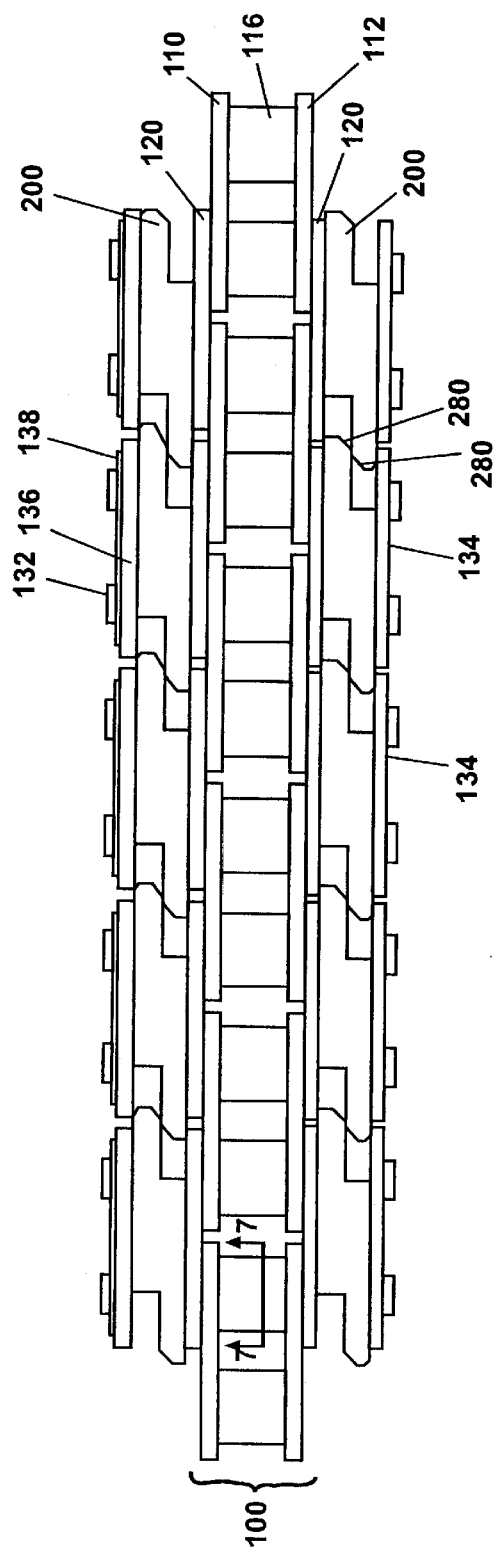
FIG. 4 is a plan view of the padded conveyor chain of FIG. 3.
Figure 5:
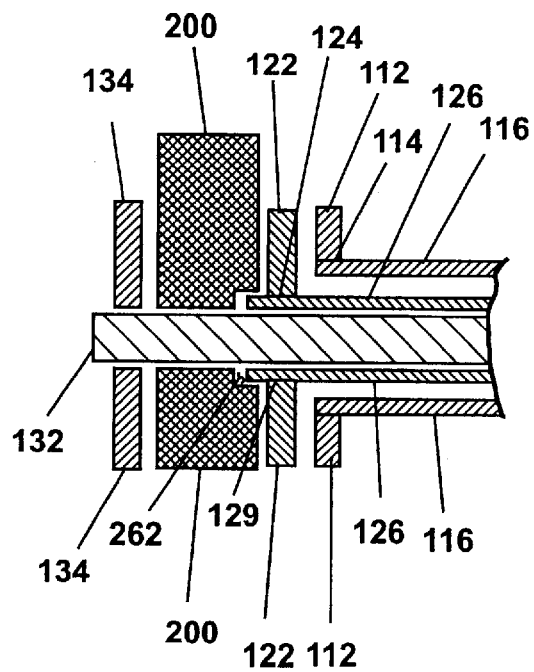
FIG. 5 is a cross-sectional view taken through line 5—5 of FIG. 4.
Figure 6:
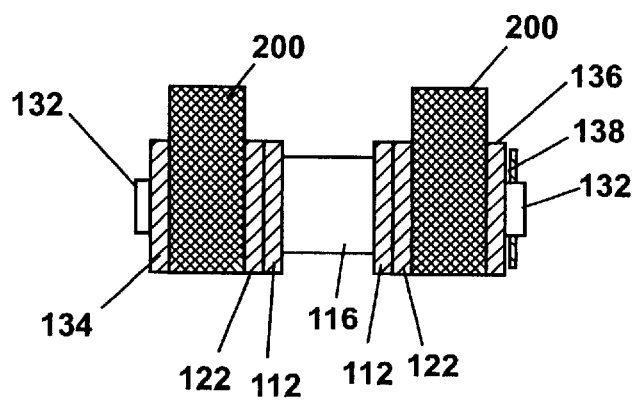
FIG. 6 is a cross-sectional view taken through line 6—6 of FIG. 5.
Figure 7:
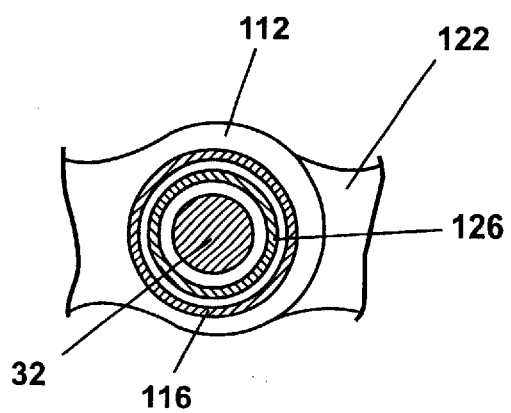
FIG. 7 is a cross-sectional view taken through line 7—7 of FIG. 6.
Figure 14:
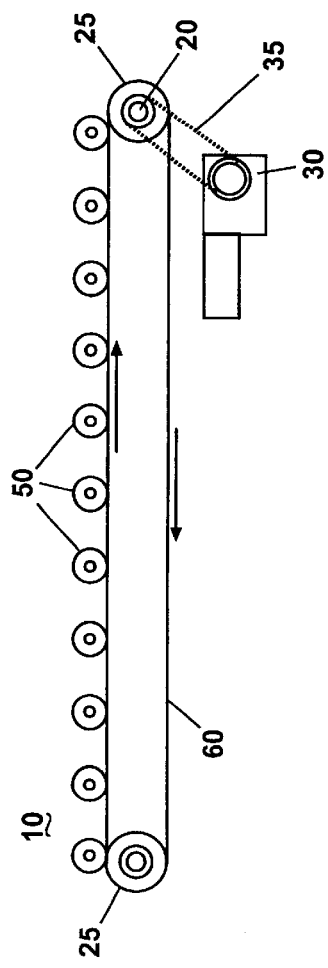
FIGS. 14–16 depict the environment of driven conveyor systems that are enabled by the present invention.
Figure 15:
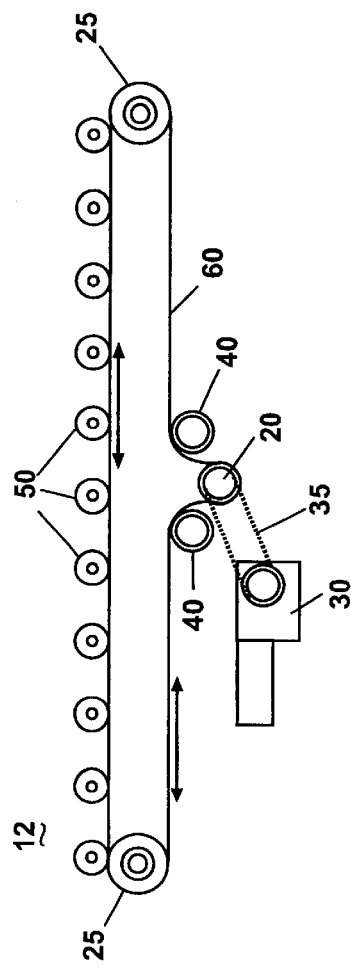
Figure 16:
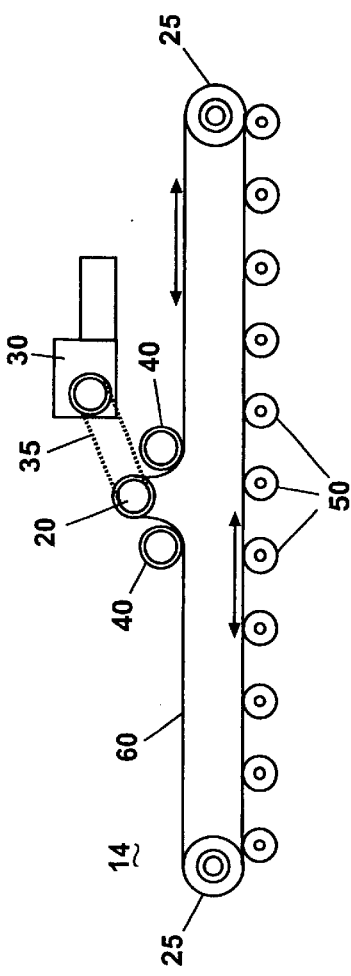

FIGS. 14, 15 and 16 depict different arrangements of chain driven roller conveyors, including conveyors requiring a "reverse wrapped" drive chain, the 160 environment in which reverse-wrapping chains is found to be beneficial. FIG. 14 shows an end-drive-type drive mechanism for a conveyor 10. A drive motor 30 through a drive belt 35 rotates a drive sprocket 20 located at an end of the conveyor 10, the drive sprocket 20 driving a padded chain 60 which, by frictional contact, drives rollers on the conveyor 10. An end sprocket 25 secures the run of chain 60 opposite the drive sprocket 20. In FIGS. 15 and 16, depicting conveyers 12, 14, respectively, the drive sprocket 20 is located intermediate the ends of the conveyor 12, 14. Chain take-up rollers 40 are arranged with the drive sprocket 20 to maintain tension on the chain 60. Two end sprockets 25 define the end of chain travel. As can be clearly seen in FIGS. 2 and 3, the chain 60 must be capable of wrapping around the take up rollers 40 and the drive sprocket 20 in opposing directions. Advantages of the arrangements in FIGS. 2 and 3 include the ability to reverse direction of the conveyor, use less space for the drive mechanism, and enable floor level conveyor systems.

While the invention has been specifically described in connection with certain specific embodiments thereof, it is to be understood that this is by way of illustration and not of limitation, and the scope of the appended claims should be construed as broadly as the prior art will permit.

What is claimed is:

1. A propelling member comprising an endless chain of links with pins extending laterally therefrom and a plurality of friction pads secured to the pins, each pad having an elongated upper surface extending between a leading end and trailing end, each leading end and trailing end having a cutout portion, each cutout portion defining a side face that overlaps a side face of an adjacent pad wherein the cutouts permit reverse wrapping of the endless chain and the elongated upper surfaces appear to define a straight line to an observer looking at the endless chain from the side thereof when the endless chain is not wrapped whereby the endless chain can propel a roller conveyor with minimal noise and propel articles with stability.

2. A propelling member according to claim 1 wherein friction pads are mounted to both sides of the endless chain.

3. A propelling member according to claim 1 wherein the friction pads are formed of resilient material.

4. A propelling member according to claim 1 and further comprising a chamfer on the side face.

5. A propelling member according to claim 1 wherein the cutout portion is arcuate and the leading end and trailing end are arcuate.

6. A propelling member according to claim 1 wherein the upper surface is planar.

7. A propelling member according to claim 1 wherein the upper surface is not planar.

8. A pad for a propelling member of the type comprising an endless chain of links with pins extending laterally therefrom, said pad comprising an elongated upper surface extending between a leading end and trailing end, each leading end and trailing end having a cutout portion, each cutout portion defining a side face adapted to overlap a side face of an adjacent pad whereby when two pads are mounted adjacent each other on adjacent links of an endless chain, the cutout portions permit reverse wrapping of the endless chain and the elongated upper surfaces appear to define a straight line above the links of the chain to an observer looking at the endless chain from the side thereof when the endless chain is not wrapped whereby the endless chain can propel a roller conveyor with minimal noise and propel articles with stability.

9. A pad according to claim 8 wherein the pad is adapted to be mounted to either side of a chain.

10. A pad according to claim 8 wherein the pad is formed of resilient material.

11. A pad according to claim 8 and further comprising a chamfer on the side face.

12. A pad according to claim 8 wherein the cutout portion is arcuate and the leading end and trailing end are arcuate.

13. A propelling member for propelling one of an article or a roller conveyor, said member comprising a chain of links with pins extending laterally therefrom and a plurality of pads secured to the pins laterally of the chain, each pad having an elongated planar upper surface extending further than the distance between adjacent pins, and a notch at each end thereof, each notch defining a side face that overlaps a side face of an adjacent pad wherein the lateral position of the pads permit the chain to engage a drive sprocket regardless of the direction of wrap of the chain, and the overlapping side faces enable the upper surfaces to define a planar contact surface when adjacent chain links are not wrapped.

14. A propelling member according to claim 13 wherein the notches are shaped to facilitate reverse wrapping of the chain regardless of the direction of wrap of the chain.

15. A propelling member according to claim 13 wherein the pads are mounted to pins on adjacent chain links to span link pairs.

16. A propelling member according to claim 13 wherein pads are mounted to both sides of the chain.

17. A propelling member according to claim 13 wherein the pads are formed of friction pads.

18. A propelling member according to claim 13 wherein the pads are formed of resilient material.

19. A propelling member according to claim 13 and further comprising a chamfer on an outside edge of each notch.

20. A propelling member according to claim 13 wherein each notch is arcuate and the end of each pad is arcuate.

21. A pad for a propelling member of the type comprising an endless chain of links with pins extending laterally therefrom, said pad comprising:

an elongated upper surface longer than the distance between adjacent pins on the chain to which the pad is to be mounted, a lower surface opposite the upper surface, and opposing end surfaces extending between the upper and lower surfaces;

a notch extending between each end surface and the upper surface, each notch defining a side face; and a pair of apertures between the notches and closer to the lower surface than the upper surface and spaced from each other the same distance as the distance between adjacent pins on the chain to which the pad is to be mounted;

so that when the pads are mounted adjacent each other on adjacent pairs of pins of a chain with side faces of adjacent notches overlapping each other, the chain can engage a drive sprocket regardless of the direction of wrap of the chain, the upper surfaces will define a substantially continuous contact surface when adjacent chain links are not wrapped, and the notches will permit reverse wrapping of the chain.

* * * * *

UNITED STATES PATENT AND TRADEMARK OFFICE
CERTIFICATE OF CORRECTION

PATENT NO. : 6,308,823 B1  
DATED : October 30, 2001  
INVENTOR(S) : David Stevens Page 1 of 1

It is certified that error appears in the above-identified patent and that said Letters Patent is hereby corrected as shown below:

Column 3,  
Line 8, "removable bide link" should be -- removable side link --  
Line 14, "pin Connector" should be -- pin connector --  
Line 21, "and an. outside" should be -- and an outside --  
Line 29, "can filly abut" should be -- can fully abut --  
Line 37, "each S other" should be -- each other --

Column 4,  
Line 7, "any raged lip" should be -- any raised lip --  
Line 38, "the chambers" should be -- the chamfers --  
Line 42, "of the. chain pads, 300" should be -- of the chain pads, 300 --  
Line 58, "the 160 environment" should be -- the environment --

Signed and Sealed this

Nineteenth Day of March, 2002

Attest:

Attesting Officer

JAMES E. ROGAN  
Director of the United States Patent and Trademark Office